US006399132B1

(12) United States Patent
Ishida et al.

(10) Patent No.: US 6,399,132 B1
(45) Date of Patent: Jun. 4, 2002

(54) SWEETENER COMPOSITION

(75) Inventors: Hirotoshi Ishida; Takeshi Nagai; Tadashi Takemoto; Yuichi Suzuki, all of Kawasaki (JP)

(73) Assignee: Ajinomoto Co., Ltd., Tokyo (JP)

( * ) Notice: Subject to any disclaimer, the term of this patent is extended or adjusted under 35 U.S.C. 154(b) by 0 days.

(21) Appl. No.: 09/581,181

(22) PCT Filed: Nov. 20, 1998

(86) PCT No.: PCT/JP98/05237

§ 371 (c)(1),
(2), (4) Date: Aug. 14, 2000

(87) PCT Pub. No.: WO99/32000

PCT Pub. Date: Jul. 1, 1999

(30) Foreign Application Priority Data

Dec. 22, 1997  (JP) .............................................. 9-352729

(51) Int. Cl.[7] .............................................. A23L 1/236
(52) U.S. Cl. ........................................ 426/548; 426/590
(58) Field of Search ................................... 426/548, 590

(56) References Cited

U.S. PATENT DOCUMENTS

| 4,158,068 A | 6/1979 | Von Rymon Lipinski et al. |
| 4,704,288 A | 11/1987 | Tsau et al. |
| 5,061,320 A | 10/1991 | Goodacre et al. |
| 5,164,214 A | 11/1992 | Wild |
| 5,473,097 A | 12/1995 | Kishimoto et al. |

FOREIGN PATENT DOCUMENTS

| HU | 215646 | 1/1999 |
| JP | 1-211468 | 8/1989 |
| JP | 4-346769 | 12/1992 |
| WO | 96/20608 | * 7/1996 |

OTHER PUBLICATIONS

B. Lanton, Food Industries of South Africa, vol. 41, No. 2, pp. 23 & 25, "Recent Developments in Sweetener Synergies", Feb. 1988.

Nalini Ayya, et al., Chemical Senses, vol. 17, No. 3, pp. 245–259, "Quantitative and Qualitative Evaluation of High–Intensity Sweeteners and Sweetener Mixtures", 1992.

* cited by examiner

Primary Examiner—Leslie Wong
(74) Attorney, Agent, or Firm—Oblon, Spivak, McClelland, Maier & Neustadt, P.C.

(57) ABSTRACT

Herein is disclosed a sweetener composition containing Aspartame and Acesulfame-K as active ingredients, wherein the amount of Acesulfame-K is 5 to 90% by weight based on the total amount of both the components and wherein the particle sizes of the both the components are respectively selected from within the range of the particle size which allows the dissolution rate of the mixture to be higher than that of Aspartame alone, in which sweetener composition the poorly dissoluble, high intense synthetic sweetener Aspartame (APM) is improved in solubility.

6 Claims, No Drawings

SWEETENER COMPOSITION

TECHNICAL FIELD

The present invention relates to a highly soluble sweetener composition containing Aspartame (hereinafter abbreviated as "APM") and Acesulfame K (hereinafter abbreviated as "ACE-K") as active ingredients.

BACKGROUND ART

It is reported that the level of sweetness of APM which is an amino acid-based synthetic sweetener, is about 200 times that of sucrose in terms of weight ratio (Japanese Patent Application Publication (Kokoku) No. 31031/'72). When compared with sucrose which is regarded as a standard for evaluating sweetness characteristics, the profile of sweetness characteristics of APM is of such that it is weak in early taste (which means that the sweetener when placed in the mouth does not taste sweet so early as sucrose does), whereas it is strong in late taste (which means that the sweetener when placed in the mouth tastes sweet later than sucrose does). Accordingly, various approaches for the improvement of the sweetness profile of APM have been proposed mainly in terms of the late taste (for example, Japanese Patent Application Laid-open (Kokai) Nos. 148255/'81, 141760/'83, 220668/'83 and the like), and a method for obtaining a more natural sweetness profile which is closer to that of sucrose, for example, by using APM in combination with sucrose has been also proposed (Japanese Patent Application Laid-open (Kokai) No. 152862/'82).

On the other hand, ACE-K is also a synthetic sweetener having a sweetness level of about 200 times that of sucrose, like APM, but has such further poorer sweetness profile that it is strong in early taste, bitter taste, astringent taste, peculiar taste, and stimulation when compared with APM. Therefore, it has been subjected to various approaches for the improvement, including the use in combination with APM for improving the sweetness profile (U.S. Pat. No. 4,158,068, and corresponding Japanese Patent Application Publication (Kokoku) No. 51262/'84). For example, the Japanese Patent Application Publication discloses the concurrent use of ACE-K and APM in a (weight) ratio of about 1:10 to 10:1, especially about 2:5 to 5:2, which, in turn, provides a sweetness profile closer to that of sucrose than that of either of the two.

Thus, various proposes have been made for improving the sweetness profile of APM, and each has been successful to some extent. Nevertheless, APM involves still such other problem concerning its solubility characteristics that an industrially produced APM powder (original crystals) is difficult to dissolve in water (because it has a tendency to form agglomerates (in Japanese, dama) and therefore, is not smooth to dissolve, and even without that, it has a lower rate of dissolution, and the like). The poorer solubility (i.e., poorer dissolution rate) due to such agglomeration and the like leads to the reduction in the production efficiency of food products or beverages to be supplemented with APM for imparting sweetness thereto, including soft drinks, which is, in turn, greatly disadvantageous to the commercial production thereof.

Some approaches for improving the solubility of APM have been proposed, including a method of graining (granulation). However, these approaches are still not satisfactory, e.g., because the solubility needs further improving (Japanese Patent Application Laid-open (Kokai) No. 346769/'92, and the like) and because a relatively larger amount of an excipient should be used concomitantly (Japanese Patent Application Laid-open (Kokai) Nos. 126855/'74, 19965/'75, 150361/'82, and the like). Incidentally, the concurrent use of ACE-K with APM disclosed in the above-mentioned Japanese Patent Application Publication (Kokoku) No. 51262/'84 is a concurrent use by merely mixing aqueous solutions of the two components (i.e., an aqueous ACE-K solution and an aqueous APM solution), and there is not made in the patent document any suggestion of the concurrent use of the two components, both in the form of original crystals or granules, nor any mention of the solubility of either of the two in the original crystals or granular form.

In view of the prior art discussed above, it is an object of the present invention to provide an excellent method for improving the solubility of APM.

DISCLOSURE OF THE INVENTION

The present inventors have made an effort to achieve the object described above and found unexpectedly that, in the presence of untreated crystals of ACE-K or a product resulting from pulverizing the untreated crystals (hereinafter abbreviated as "pulverized ACE-K"), untreated crystals or granules of APM undergo no agglomeration during dissolution (in water) and exhibit a higher dissolution rate as compared with the case of APM alone, i.e., that APM is on the whole improved in solubility, thus establishing the present invention.

Accordingly, the present invention relates to a sweetener composition comprising Aspartame and Acesulfame-K as active ingredients, wherein the amount of Acesulfame-K is 5 to 90% by weight based on the total amount of both the components and wherein the particle sizes of both the components are respectively selected from within the range of the particle size which allows the dissolution rate of the mixture to be higher than that of Aspartame alone.

The present invention will be further described in greater detail below.

APM, which is one of the active ingredients of a sweetener composition of the present invention, can be a commercially available untreated crystalline powder (untreated crystals) as it is or granules having a larger particle size made by granulating such untreated powder. While it is known that APM is imparted with an improved solubility when it is granulated (Japanese Patent Application Laid-Open (Kokai) No. 346769/'92, described above), it has been found by the present inventors that the solubility of such granules can be further improved in the presence of ACE-K. Furthermore, it has been found that APM can be still imparted with a higher solubility in the presence of ACE-K also when it is in the form of untreated crystals.

Granules of APM can be produced by granulating an APM original crystalline powder. The granulation is not particularly limited, and can be conducted in accordance with a known method. For example, a dry granulating process and also a wet granulating process can be employed. Specifically, granules can be produced by various methods such as mixing granulation, compacting granulation, extrusion granulation, fluidization granulation, rotation granulation, pulverization granulation, spray coating, tabletting or the like. However, for the purpose of less heat load and less complicated manufacturing process, it is commercially advantageous to employ a dry granulation process such as compacting granulation.

ACE-K which is the other active ingredient of a sweetener composition of the present invention can be incorporated in the sweetener composition as untreated crystals as they are or after being pulverized (i.e., in the pulverized form).

An untreated crystalline powder of ACE-K can be prepared by a known method and converted into one having a desired particle size by means of crystallization and, if necessary, pulverization.

The mixing ratio (ratio of amounts employed) of APM and ACE-K in a sweetening composition of the present invention is appropriate when the ACE-K is present in an amount of 5 to 90% by weight based on the total amount of both the components. Incidentally, an ACE-K content of 5% by weight or less provides almost no dissolution-promoting effect by ACE-K, while that of 90% by weight or higher causes the bitter taste of the ACE-K to get evident, which is of course undesirable.

Even with a mixing ratio between APM and ACE-K specified above, the dissolution-promoting effect by ACE-K on APM varies depending on the particle sizes of APM (untreated crystalline powder or granule) and ACE-K (untreated crystalline powder or pulverized product). Too small particle size of APM may cause formation of agglomerates (in Japanese, dama) and may cause the APM to float on the surface of water instead of being dispersed in water, which may, in turn, take a prolonged time period for dissolution, while a too large particle size of the granules may result in a reduction of the interface area where the particles and the water are in contact, which may, in turn, take a prolonged time period for dissolution. APM to float on the surface of water instead of being dispersed in water, which may, in turn, take a prolonged time period for dissolution, while too a large particle size of the granules may result in a reduction in the interface area where the particles and the water are in contact, which may, in turn, take a prolonged time period for dissolution.

An improvement in the solubility of APM as a result of admixing ACE-K is due to the prevention thereby of the agglomeration of APM and the prevention thereby of the floating of APM on the surface of water, and a more thorough mixing of both the components provides a higher effect. A higher effect is obtained with a smaller particle size of ACE-K since a more thorough mixing is possible. ACE-K whose true specific gravity is 1.85 (in contrast to 1.36 of APM) exhibits a satisfactory sedimentation, and its high solubility allows fine particles, which tend to float, to be readily dissolved and disappear. Incorporation of ACE-K also reduces the floating of APM on the liquid surface. A higher effect by a smaller particle size of APM is due not only to a more thorough mixing but also to the prevention of the agglomeration and the prevention of the floating on the liquid surface, and to the fact that larger particles limit the dissolution rate.

As has been described above, ACE-K exhibits a higher dissolution-improving effect on APM when its particle size is smaller, and the average particle size is preferably about 250 μm or less. The maximum particle size is preferably about 500 μm or less, and more preferably about 250 μm or less. ACE-K having such a small particle size can be readily prepared by pulverizing an ACE-K untreated crystalline powder by a known appropriate method. While APM exhibits a higher solubility when it is in the granule form than when it is in the untreated crystalline powder, an excessively large particle size poses a prolonged time period required for dissolution as described above, and the average particle size is preferably about 500 μm or less.

In a given case, the particle size of ACE-K which exerts a marked dissolution-promoting effect on APM can be determined as a particle size of ACE-K in the admixture with which a given untreated crystalline powder (untreated crystals) or given granules of APM can exhibit a significantly improved dissolution rate (time period required for dissolution) as compared with the dissolution rate of the same APM untreated crystalline powder (untreated crystals) in the same quantity as contained in the above mixture when tested alone (see Experiment 1, last paragraph, described below). It is a matter of course that such particle size of ACE-K for a given APM untreated crystals can be readily determined by those skilled in the art by performing a preliminary test.

Incidentally, when APM and ACE-K having inventive particle sizes are placed in water separately but simultaneously (separate addition) without mixing previously at an inventive ratio (as in the case of an inventive sweetening composition), ACE-K having a high dissolution rate dissolves rapidly and prevents the dissolution rate of APM from being dependent on the particle size of ACE-K, resulting in the dissolution rate of APM as a sole component (Experiment 3 described below).

The inventive sweetener composition can, depending on its use, contain a diluent or an excipient such as a sugar alcohol, an oligosaccharide and a dietary fiber as well as other high intense synthetic sweetener(s) such as Alitame, Saccharin, 3,3-dimethylbutylaspartylphenylalanine methylester and the like, like in the case of conventional intense synthetic sweetener compositions, for the purpose of obtaining a better handling or improving the sweetness profile, as long as the improved solubility of APM according to the present invention is not affected adversely. A diluent or an excipient referred to herein includes a low intense sweetener such as sucrose, glucose and the like.

The solubility of APM granules (i.e., granules consisting of APM alone) as disclosed in the above-mentioned Japanese Patent Application Laid-open (Kokai) No. 346769/'92, is just less unsatisfactory than that of an APM original powder, and further improvement of the solubility is demanded by users. In accordance with the present invention, such further improvement of the solubility of APM has been realized, and also an excellent sweetener can be produced in which the sweetness profiles of both of APM and ACE-K are improved.

BEST MODE FOR CARRYING OUT THE INVENTION

The present invention will be further described with reference to the following Experiments.

Experiment 1

(Solubility of Mixture of APM Untreated Powder and ACE-K Untreated Powder)

A 1 L dissolution tester (the Japanese Pharmacopoeia, Paddle method (container of 100 mm in inner size, 160 mm in height, having a hemispheric bottom of 50 mm in radius, and a net volume of 1,000 ml; paddle formed by sectioning a disc of 83 mm in size, and 3 mm in thickness, with parallel strings of 42 mm and 75 mm in length; 25 mm in distance between the lower end thereof and the container bottom), 100 rpm) was used together with 900 ml of water (20° C.), in which a sample was placed in a predetermined amount and examined for the time period required for dissolution (the endpoint being judged visually).

In greater detail, an APM untreated crystalline powder (average particle size being about 15 μm, and maximum particle size being about 100 μm; IB-type bundle-like crystals) and an ACE-K untreated crystalline powder (average particle size being about 250 μm, and maximum particle size being about 500 μm) were mixed in a varying ratio indicated (in terms of % by weight of ACE-K) in Table 1 shown below to prepare mixtures. 1 g potion was taken from each mixture and examined for the time period required for dissolution. For comparison, 1 g of the APM untreated powder described above was also examined for the time period required for dissolution. For reference, 0.5 g and 0.10 g of the APM untreated powder were also examined for the time periods required for dissolution.

The samples exhibited their respective time periods (min) required for dissolution indicated in Table 1 shown below.

TABLE 1

Time period (min) for dissolution of mixture of APM untreated powder and ACE-K untreated powder

|  | APM alone (untreated powder) | | | Mixture (1 g) % By weight of ACE-K untreated powder (APM untreated powder) | | | |
| --- | --- | --- | --- | --- | --- | --- | --- |
|  |  |  |  | 5% | 20% | 50% | 90% |
| Sample | 1.00 g | 0.50 g | 0.10 g | (0.95 g) | (0.80 g) | (0.50 g) | (0.10 g) |
| Dissolution time (min) | 30 | 20 | 10 | 15 | 11 | 6 | 4 |

As is evident from the table shown above, the solubility of the mixtures (inventive sweetener compositons) was improved markedly as compared with the APM untreated crystalline powder.

Incidentally, the sweetness level of both APM and ACE-K is about 200 times that of sucrose as described above. Accordingly, the amount of a sample of an APM untreated powder alone which should be compared in time period required for dissolution with 1 g of a mixture sample is 1 g which is the same amount of the mixture sample because such time period can be regarded as the time period required for obtaining the same sweetness. Nevertheless, the results obtained when 0.5 g and 0.1 g of a sample consisting only of an APM untreated powder were determined just for reference revealed that ACE-K has the dissolution-promoting effect on APM.

Experiment 2
(Solubility of Mixtures of APM having a Varying Particle Size and Pulverized ACE-K)

The time period for dissolution of a mixture of an APM having a varying particle size (untreated powder or granules) and a pulverized ACE-K was determined in the same manner as in Experiment 1.

The APM untreated powder employed was the same untreated powder as employed in Experiment 1 (average particle size being about 15 μm, and maximum particle size being about 100 μm or less). The untreated powder was granulated using a dry rol mill (dry compaction and disintegration), and sieved to obtain fractions having a varying particle size. Specifically, the dry compaction and dry disintegration were performed using a compacting machine "ROLLER COMPACTER Model WP90 X 30" (ex TURBO KOGYO), and the mixture was, upon compaction, fed to the compacting machine via a screw feeder (88 rpm) under a roll pressure of 4.9 Mpa at a roll speed of 12 rpm, and then disintegrated using a fine granulator screen of 12 mesh size (pore size being 1,400 μm). The granules were sieved using a JIS (Japanese Industrial Standard) standard sieve.

A pulverized ACE-K employed was that prepared by pulverizing the same ACE-K as employed in Experiment 1 (average particle size being about 250 μm, and maximum particle size being about 500 μm) by a compact laboratory centrifugal pulverizer (250 μm φ screen; 20,000 rpm) to obtain a pulverized ACE-K whose average particle size was about 20 μm and whose maximum particle size was about 250 μm.

The sample amount of a mixture and the sample amount of APM alone (untreated powder or granules of APM alone) were the same as in Experiment 1.

The time period (min) required for dissolution of each sample is indicated in Table 2 shown below.

TABLE 2

Time period (min) required for dissolution of a mixture of APM untreated powder or granules and pulverized ACB-K

|  |  | APM alone (untreated powder or granules) | | | Mixture (1 g) Pulverized ACB-K (APM untreated powder or granules) | | | |
| --- | --- | --- | --- | --- | --- | --- | --- | --- |
|  |  |  |  |  | 5% | 20% | 50% | 90% |
|  | Sample | Particle size | 1.00 g | 0.50 g | 0.10 g | (0.95 g) | (0.80 g) | (0.50 g) | (0.10 g) |
| Dissolution time (min) | to 100 μm | (Untreated powder) | 30 | 20 | 10 | 5 | 3 | 3 | 3 |

TABLE 2-continued

Time period (min) required for dissolution of a mixture of APM untreated powder or granules and pulverized ACB-K

| Sample | Particle size | | APM alone (untreated powder or granules) | | | Mixture (1 g) Pulverized ACB-K (APM untreated powder or granules) | | | |
|---|---|---|---|---|---|---|---|---|---|
| | | | 1.00 g | 0.50 g | 0.10 g | 5% (0.95 g) | 20% (0.80 g) | 50% (0.50 g) | 90% (0.10 g) |
| | 100 to 300 μm | (Granules) | 18 | 17 | 7 | 9 | — | 5 | — |
| | 300 to 500 μm | (Granules) | 18 | 17 | 7 | 12 | — | 8 | — |

As is evident from Table 2 shown above, APM can be improved markedly in solubility by ACE-k, at various particle sizes.

Experiment 3
(Separate Addition of APM Untreated Powder and Pulverized ACE-K)

The same APM untreated powder as employed in Experiment 1 (average particle size being about 15 μm, and maximum particle size being about 100 μm) and the same pulverized ACE-K as employed in Experiment 2 (average particle size being about 20 μm and maximum particle size being about 250 μm) were examined for the time periods required for dissolution in the same manner as in Experiment 1.

Thus, 0.5 g of each of both the components were taken (1.0 g in total) and added to the dissolution tester simultaneously without admixing previously (separate addition). The results are indicated in Table 3 shown below. Just for reference, the time period required for dissolution of 0.5 g of the APM untreated powder alone (experiment 1) is also indicated.

TABLE 3

Time period (min) required for dissolution of APM and ACE-K added separately and simultaneously

| Sample | APM alone (untreated powder) (0.5 g) | Separate addition (1 g in total) (0.5 g APM untreated powder/0.5 g pulverized ACE-K) |
|---|---|---|
| Dissolution time (min) | 20 | 20 |

As is evident from Table 3 shown above, no solubility-improving effect by ACE-K on APM was observed when APM and ACE-K were added separately without admixing previously. This is because of an extremely rapid dissolution of ACE-K as described above.

INDUSTRIAL APPLICABILITY

By mixing an untreated powder or granules of Aspartame (APM) and an untreated crystalline powder or a pulverized product of Acesulfame-K (ACE-K) according to the present invention, the poor solubility (i.e., poor dissolution rate) of APM can be improved markedly, and a sweetener having an excellent sweetness profile can readily be prepared.

We claim:

1. A sweetener composition comprising a mixture of untreated crystalline powder or granules of Aspartame and untreated crystalline powder or pulverized product of Acesulfame-K, wherein the amount of Acesulfame-K is 5 to 90% by weight based on the total amount of both components and wherein the particle sizes of both components are respectively selected from within a range of the particle size which provide a dissolution rate of the mixture higher than that of the Aspartame particles alone.

2. The sweetener composition according to claim 1, wherein the average particle size of said Acesulfame-K is about 250 μm or less.

3. The sweetener composition according to claim 1, wherein the maximum particle size of said Acesulfame-K is about 250 μm or less.

4. The sweetener composition according to claim 1, wherein the average particle size of said Aspartame is about 500 μm or less.

5. The sweetener composition according to claim 2, wherein the average particle size of said aspartame is about 500 μm or less.

6. The sweetener composition according to claim 3, wherein the average particle size of said aspartame is about 500 μm or less.

* * * * *